United States Patent [19]
Lake

[11] Patent Number: 5,546,926
[45] Date of Patent: Aug. 20, 1996

[54] WHOLE HOUSE HUMIDIFIER FOR USE WITH HOT AIR HEATING SYSTEMS

[76] Inventor: Jared L. Lake, 1365 Old Garth Hts., Charlottesville, Va. 22901

[21] Appl. No.: 319,935

[22] Filed: Oct. 7, 1994

[51] Int. Cl.⁶ .............................. F24F 3/14; A61M 16/00
[52] U.S. Cl. .......................... 126/113; 137/392; 261/142; 392/391
[58] Field of Search ............................ 126/113; 392/391; 261/142, DIG. 46, 45, 65; 137/392

[56] References Cited

U.S. PATENT DOCUMENTS

| | | | |
|---|---|---|---|
| 3,178,159 | 4/1965 | Johnson | 392/391 X |
| 3,209,124 | 9/1965 | Morrissey et al. | 126/113 X |
| 3,209,125 | 9/1965 | Morrissey | 126/113 X |
| 3,523,175 | 8/1970 | Gygax | 126/113 X |
| 3,660,635 | 5/1972 | Liebert | 126/113 X |
| 4,222,971 | 9/1980 | Ellert | 261/92 |

*Primary Examiner*—William E. Wayner
*Attorney, Agent, or Firm*—Sheldon H. Parker

[57] ABSTRACT

A hot air furnace humidifier has a heat chamber and a duct connecting the chamber to a furnace. The chamber has a water retaining vessel, preferable provided with a disposable liner. A pair of level sensors register the minimum and maximum water level within the vessel. The water level sensors can be either in proximity with the water or submerged within the water. A heating element incorporates a heat sensing device and can be provided with a thermostat and in proximity with the water or submerged. A water refill pipe is provided with an on/off device and automatically refills the vessel in response to the electronic controls. The electronic controls are connected to the water level sensors, heating element and water refill pipe. The controls can include a humidistat and/or be incorporated with the furnace controls. The electronic controls control the water level based on information received from the water level sensors and the temperature based on information received from the heating element, thereby providing constant evaporation within the heat chamber.

5 Claims, 4 Drawing Sheets

WHOLE HOUSE HUMIDIFIER FOR USE WITH HOT AIR HEATING SYSTEMS

BACKGROUND OF THE INVENTION

1. Field of the Invention

The invention relates to a humidifying system which is attached to an existing forced air heating system for humidifying the entire region of the house serviced by the forced air heating system.

2. Brief Description of the Prior Art

Humidifiers are commonly used in homes during the winter to supplement the drop in humidity due to heating systems. Hot air systems tend to lower the humidity more than other systems, due to the evaporation of water particles during heating. This, and the fact that hot air furnaces are the easiest to fit with humidifiers, have opened the prior to art such devices. Most prior art devices for hot air systems use a "wetted element". The stationary type of element, such as a sponge, is kept wet through use of a constant flow of water. The rotating elements comprise a wheel or drum covered by a pad which continually rotates in water. The humidifier is connected to the house hold water supply and accordingly need not be manually refilled. However, the evaporation of water leaves behind mineral deposits and cleaning is required.

Evaporative humidifiers typically employ a capillary action to draw water into the filter or pad. The material of the pad is selected for its ability to exhibit a wicking action. The evaporative systems have the advantage of using little energy, using tap water, and unlike impeller systems, do not spray bacteria into the air along with moisture. The filter or pad must be periodically replaced and cleaning is required to deter growth of undesirable microorganisms.

Ultrasonic humidifiers employ a transducer and nebulizer which oscillates at about 1.7 million times a second in order to form a cool mist. While few microorganisms are released into the air, an annoying white dust is produced from the tap water.

In steam mist systems, water flows into a heating chamber, where it is kept at the boiling point. As the water boils, it releases moisture into the air. The system kill microorganisms through the boiling of the water and emits little or no white dust, but requires a high consumption of energy and the heating element may require extra cleaning to remove the accumulated hard-water minerals.

Impeller systems employ a fan or impeller which pumps water upwardly and slings water droplets into the air. The systems require soft water, distilled water or a demineralization cartridge rather than being a simple, tap water system.

In the drum type humidifier disclosed in U.S. Pat. No. 3,476,673, a chamber is provided for holding tap water or other liquid which is applied to an evaporator medium of a rotating drum. The liquid is evaporated from the evaporator medium into a hot air stream of a furnace to humidity the air stream.

A disadvantage to the drum type humidifiers is the necessity of removing accumulated dirt, dust, lime and other material deposits accumulated in the water reservoir chamber. Minerals, such a lime, will adhere to the surfaces of the chamber and wheel, making the chemicals difficult to remove.

U.S. Pat. No. 4,222,971 teaches the use of a liner for a drum-type humidifier which can be readily removed and replaced as needed. This, however, does not solve the problem of chemicals adhering to the wheel or other passage ways where water is in contact.

The chemical build-ups, that is mineral deposits in units such as these, can greatly reduce the efficiency of the humidifier. In areas where there is heavy chemical content in the water, the units can require constant cleaning.

The instant invention overcomes the problems associated with the prior art by eliminating many of the parts which are susceptible to chemical accumulation and by providing a readily disposable liner which serves to eliminate or minimize the cleaning operation normally associated with humidifiers.

SUMMARY OF THE INVENTION

The whole house humidifier of the invention is employed with a forced hot air furnace. The system includes a heat chamber and a duct connecting the heat chamber to the furnace duct work. The moving, warmed air of the heating system cooperates with the humidifier to evaporate water which is contained in a reservoir, thereby producing humidification. The system is designed to meet the typical house requirement of about 10 gallons per day for a 2,400 square foot house or 15 gallons per day for a 3,400 square foot house.

The heat chamber has a water retaining vessel which is preferably provided with a removal, disposable liner. A pair of water level sensors register the minimum and maximum water level within the vessel. In one embodiment, the water level sensors are in proximity with the water and in another embodiment the water level sensors are submerged within the water. A heating element incorporates a heat sensing device and can be provided with a thermostat. The heating element can be either in proximity with the water or submerged within the water. A water refill pipe is provided with an on/off device and automatically refills the vessel in response to the electronic controls. The electronic controls are connected to the water level sensors, heating element and water refill pipe. The controls can further include a humidistat and, alternatively, the controls can be incorporated with the controls of the furnace. The duct connects the heat chamber to the furnace duct work. The electronic controls control the water level based on information received from the water level sensors and the temperature based on information received from the heating element, thereby providing a constant level of evaporation within the heat chamber to be drawn through the duct.

While air flow can readily be restricted, humidity tends to equalize across barriers. Thus, the humidifier interacts with the forced air system in that the warm dry air of the forced air system, draws moisture from the heat chamber. For this reason it is not necessary to boil the water to achieve the required evaporation. Obviously, heating to the boiling point would increase the rate of evaporation. While this may be critical in portable humidifiers which service a single room, in the instant system, the heat chamber is constantly in contact with a fresh supply of dry air. As the humidity of the supply air increases, the effectiveness of the system decreases. Thus, the present system does not have the tendency to supersaturate the air, in the manner characteristic of boiling water systems.

BRIEF DESCRIPTION OF THE DRAWINGS

The advantages of the instant disclosure will become more apparent when read with the specification and the drawings, wherein.

DETAILED DESCRIPTION OF THE INVENTION

Figure 1:
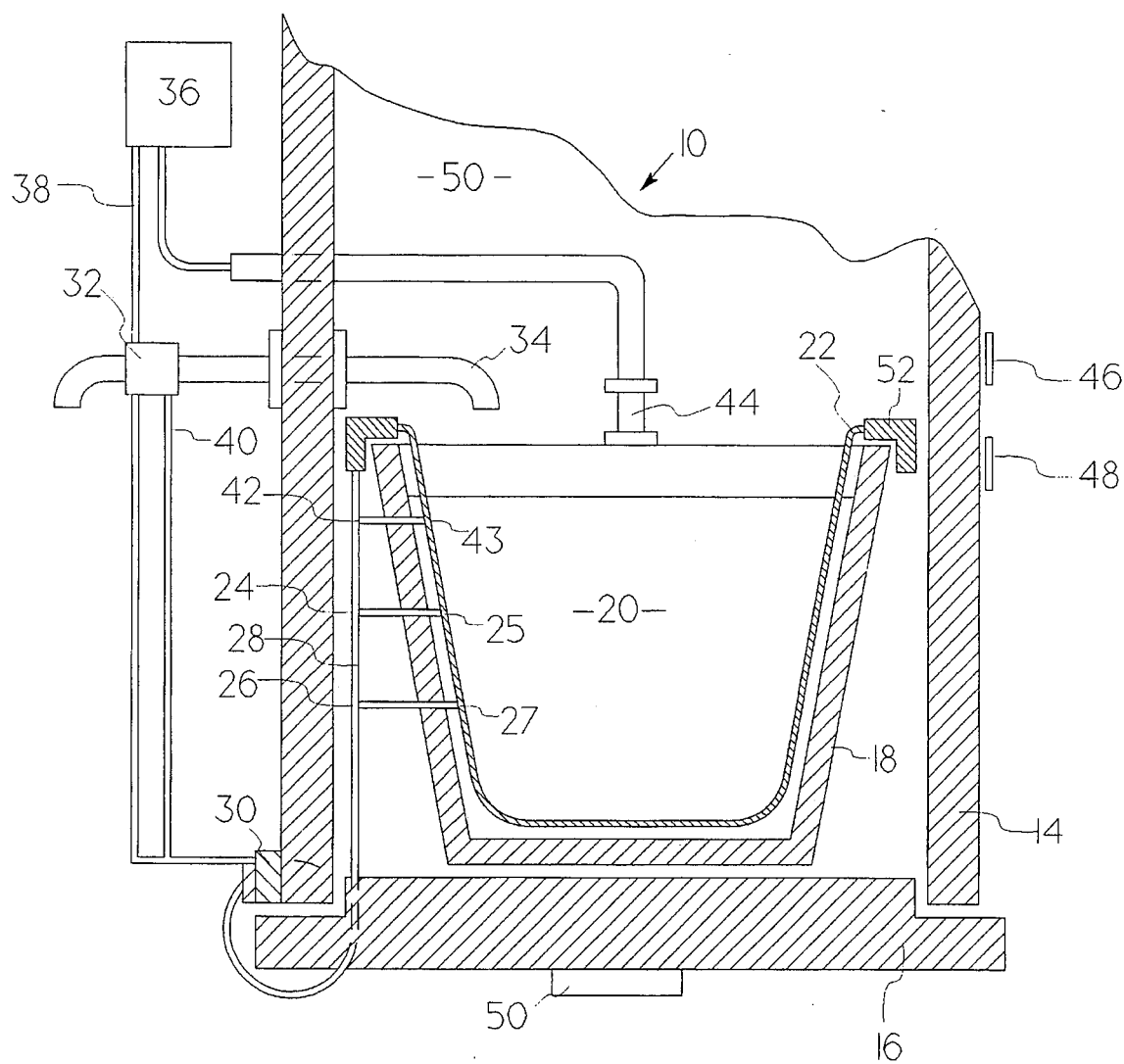
FIG. 1 is a cutaway side view of the instant device.

The instant device, shown in FIG. 1, is a heat chamber 10 which supplies humid air into a hot air heating system. The heat chamber 10, illustrated herein, can be attached to a hot air furnace through various means, such as straps 46 and 46. The heat chamber 10, as disclosed herein, can also be incorporated within a hot air furnace during manufacture. In the event the heat chamber 10 is build into the hot air furnace, only minor alterations to the add-on design would be required. The method of securing the heat chamber 10 to the furnace would be eliminated and the electronics incorporated with the electronics of the furnace. The heat chamber 10 which is manufactured to be retrofitted onto existing furnaces is discussed herein, however the required alterations to the disclosed device will be obvious to one skilled in the art.

Figure 4:
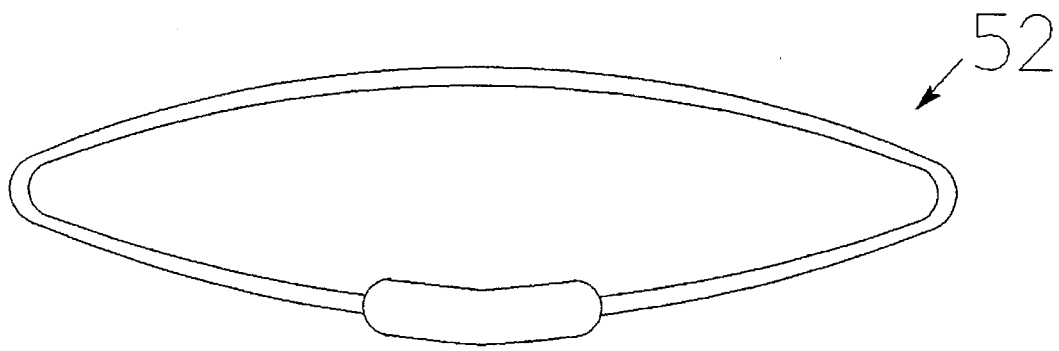
FIG. 4 is a perspective view of a method of retaining the plastic liner of the instant invention.

The cylindrical heat chamber 10 wall 14 and base 16 are preferably manufactured from ceramic, although plastics with a high temperature tolerance can also be used. The ceramic is advantageous in that it has a longer life span, however plastic has the advantage that it is lighter. Other materials can be used, however the material must be watertight, insulated and heat resistant. For example, the heat chamber 10 can be manufactured from metal, however to avoid extensive heat loss, the wall 14 and base 16 is preferably insulated. A retaining vessel 18, which holds the water 20 to be evaporated, is placed within the heat chamber 10. The retaining vessel 18 is preferably manufactured from the same type of materials set forth heretofore. The retaining vessel 18 can be allowed to sit directly on the base 16, although it is recommended that it be either permanently or removably affixed to the base 16 for stability. In order to eliminate mineral build-up within the retaining vessel 18 a disposable liner 22 is used. Mineral build-up is a constant problem with humidifiers, however the use of a liner has been proven to overcome this problem. The liner 22 is retained within the reservoir 18 by the locking ring 52. The locking ring 52, shown in FIG. 4, is a L-shaped ring which when opened increases to a diameter greater than when closed. This type of locking ring 52 is used as a locking apparatus for various drum type containers and is provided herein only as an example. Alternatively, a U-shaped plastic hoop can be used to lock the liner 22 in place. Other locking means will be obvious to those skilled in the art.

The retaining vessel 18 is provided with a pair of level sensors 24 and 42 which are connected to the sensing apparatus 30 by a flexible electrical lead 28. The lower level sensor 24 is set at the lowest desired level of the water 20 and, when the water level falls below that level registers the drop. A signal indicating the water level drop is sent from the lower level sensor 24 to the sensing apparatus 30. The sensing apparatus 30, in turn, sends a signal to the refill pump 32, through conduit 40, activating the refill pump 32. The water flows through the refill pipe 34 into the retaining vessel 18 until the water level reaches the upper level sensor 42. The upper level sensor 42, set at the highest operable level, sends a deactivation signal to the sensing apparatus 30 to deactivate the refill pump 32. Alternatively, the upper level and lower level sensors 24 and 42 can be connected directly to the control box 36, eliminating the need for the sensing apparatus 30. The level sensors are set to prevent the water 20 from either evaporating completely or overflowing the vessel 18.

The inner probe portions 27, 25 and 43 of the heat and water level sensors can be on the side of the liner adjacent the interior of the vessel 18. Alternatively, the water sensors probe portions of the water level sensor can be press fit elements which pass through the liner and are press fit into respective receivers. This provides direct contact with the water rather than reading water level through the liner. The heat sensor can be similarly positioned in direct contact with the water, although there is less need for the direct temperature reading than there is for direct water level sensing. The elements can be disposable members, such that there is an ease of replacement if they become encrusted with minerals or corroded. The use of bimetal temperature sensing has the advantage that the flexing of the bimetal tends to render the device self cleaning. Leakage of water around the sensor where it passes through the liner is not significantly detrimental, particularly if the liner is of a wetable, water absorbing material. Leakage can be minimized or eliminated through the use of conventional "O"-rings which are place between the liner and the enlarge portion of the sensors 27, 25 and 43, and held in place by forcing the respective probes into their respective receiving elements. Thus, the probes can be replaced when the liners are replaced, or cleaned and reused. The liner thus can be of a blotter paper type of material or a moisture impermeable plastic.

The heat sensor 26 monitors the temperature of the water 20 within the retaining vessel 18. The readings obtained by the heat sensor 26 are fed through the electrical lead 28 to the sensing apparatus 30. The sensing apparatus 30 is electrically connected to the control box 36 through conduit 38. The sensing apparatus 30 is preferably provided with an adjustable thermostat and any fall in water temperature below the preset level sends an activate signal to the control box 36. Conversely, the rise in temperature to the present level sends a deactivate signal to the control box 36. The adjustable thermostat provides the added convenience of being able to regulate the preset temperature manually. The control box 36 serves to activate and deactivate the heating unit 44, thereby maintaining the temperature at the present level. The heating unit 44 is placed above the water 20 to prevent mineral build-up. The heating unit 44 must be manufactured with adequate power to heat and maintain the heat chamber 10 at a temperature sufficient to cause the water to vaporize. There are various types of level and heat sensors known in the prior art which can be utilized in the instant device and will be known to those skilled in the art. Level sensors are commonly used in the sump pump art and can be readily incorporated in the instant invention.

The base 16 provides access to the vessel 18. The base 16 is threadably attached to the wall 14 and is rotated through use of the bolt 50. To replace the liner 22, the system is shut off and allowed to cool. The base 16 is then unscrewed to allow for the base 16 and retaining vessel 18 to drop down. It should be noted that the electrical lead 28 must be flexible with sufficient length to readily reach the floor of the room. Any remaining water within the vessel 18 is dumped and the liner 22 replaced. Once the new liner is in position, the retaining vessel 18 is replaced in the heat chamber 10 and the base 16 retightened.

The embodiment disclosed in FIG. 1 utilizes the probes within the vessel 18. Because the probes 24, 26 and 42 penetrate the vessel 18, the vessel 18 cannot revolve with the base 16 with the probes attached. Therefore, the lead 28 is directed through the base 16 and plugged into the sensing apparatus 30 from the outside of the heat chamber. When the base 16 is rotated to remove the vessel 18, the lead 28 is unplugged at the sensing apparatus 30 allowing for free rotation.

The present temperature must be sufficiently high enough to generate steam. Basic physics causes the steam to rise in the duct 50 to be incorporated with the hot air of the heating system. The rise and distribution of the steam is further enhanced through the forced air movement of the heating system itself.

Figure 2:
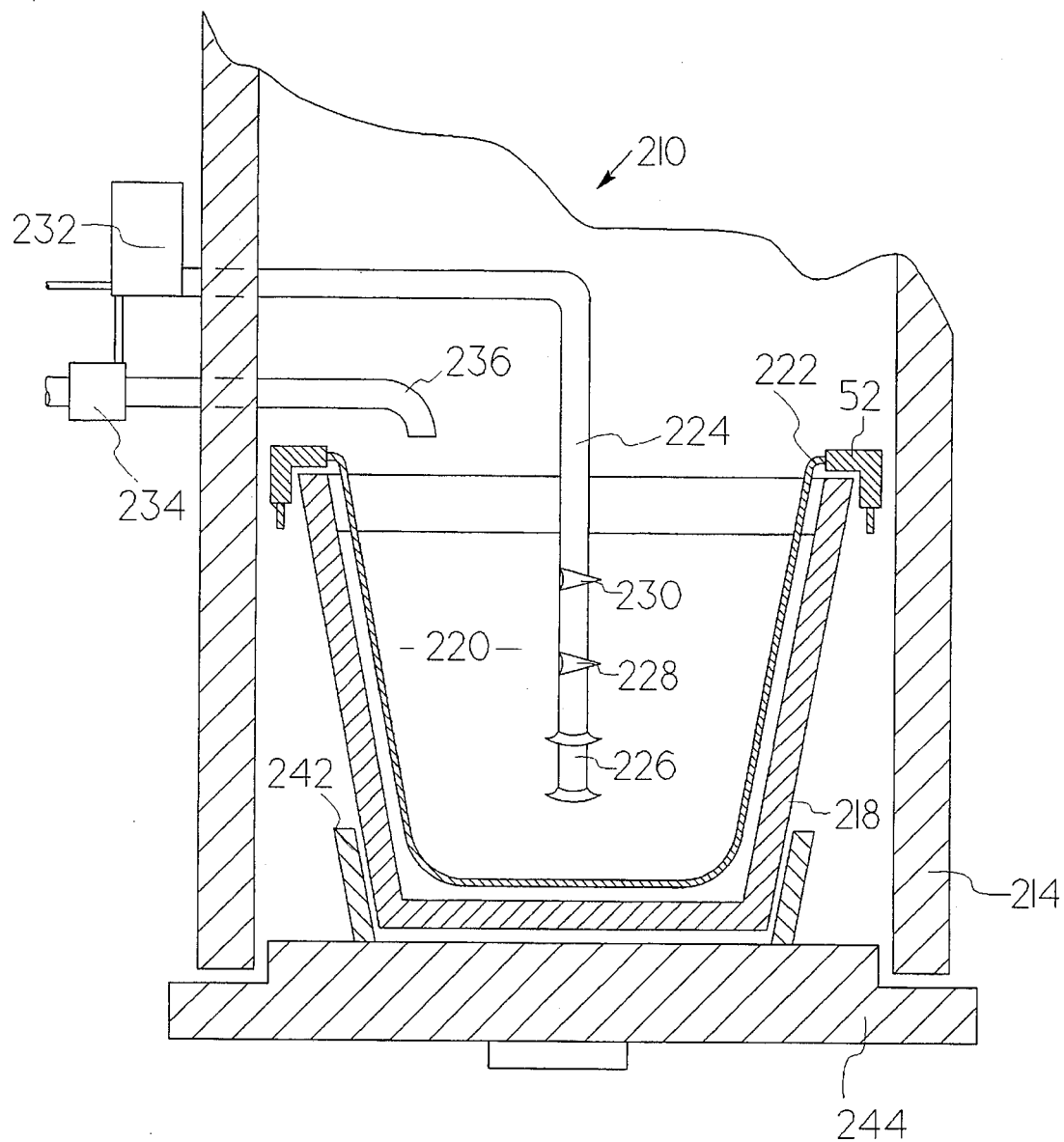
FIG. 2 is a cutaway side view of another embodiment instant device.

An alternate embodiment to the heat chamber 10 of FIG. 1 is illustrated in FIG. 2 wherein heat chamber 210 is shown. The heat chamber 210 is provided with a retaining vessel 218 and liner 222, as previously described. The heat chamber 210 does not have the sensors 24, 26 and 42 placed through the vessel wall, as described heretofore, but rather incorporates all of the sensors along the sensor piping 224. The wiring for the upper and lower level sensors 228 and 230 and the heat sensor/heating element 226 is contained within the sensor piping 224. The wiring terminates at the control box 232 which contains the electronics to activate and deactivate the system. The distal end of the sensor piping 224 is provided with a heating element 226 which extends into the retaining vessel 218. The heat sensor/heating element 226 preferably has the ability to detect the temperature of the water 220, relaying the information to the control panel 232. Alternatively the heating element 226 can be provided with an internal thermostat which can automatically activate the heating unit 226. The lower level sensor 228 detects the lower limit of the water 220 and, once the water has passed that point, the sensor 228 sends a signal to the control box 232. The control box 232 activates the water pump 234 to fill the retaining vessel 218 through water pipe 236. The water level is brought to the level of upper level sensor 230 where a shut-off signal is transmitted to the control box 232. Centralizing the sensor responses at the control box 232 provides the ability to provide more sophisticated programming. This can include having the heating element 226 heat the remaining water prior to refilling the vessel 218 with cold water to avoid a time lapse. Additionally a humidistat can be wired to the control box 232 to automatically increase or decrease the evaporate rate.

The base 244 is threadably attached to the wall 214 as set forth heretofore. the base 244 is provided with brace 242 which prevents the vessel 218 from sliding. Since the sensor are contained within the piping 224, the vessel 218 can rotate freely within the heat chamber 210 during removal to the base 244.

Figure 3:
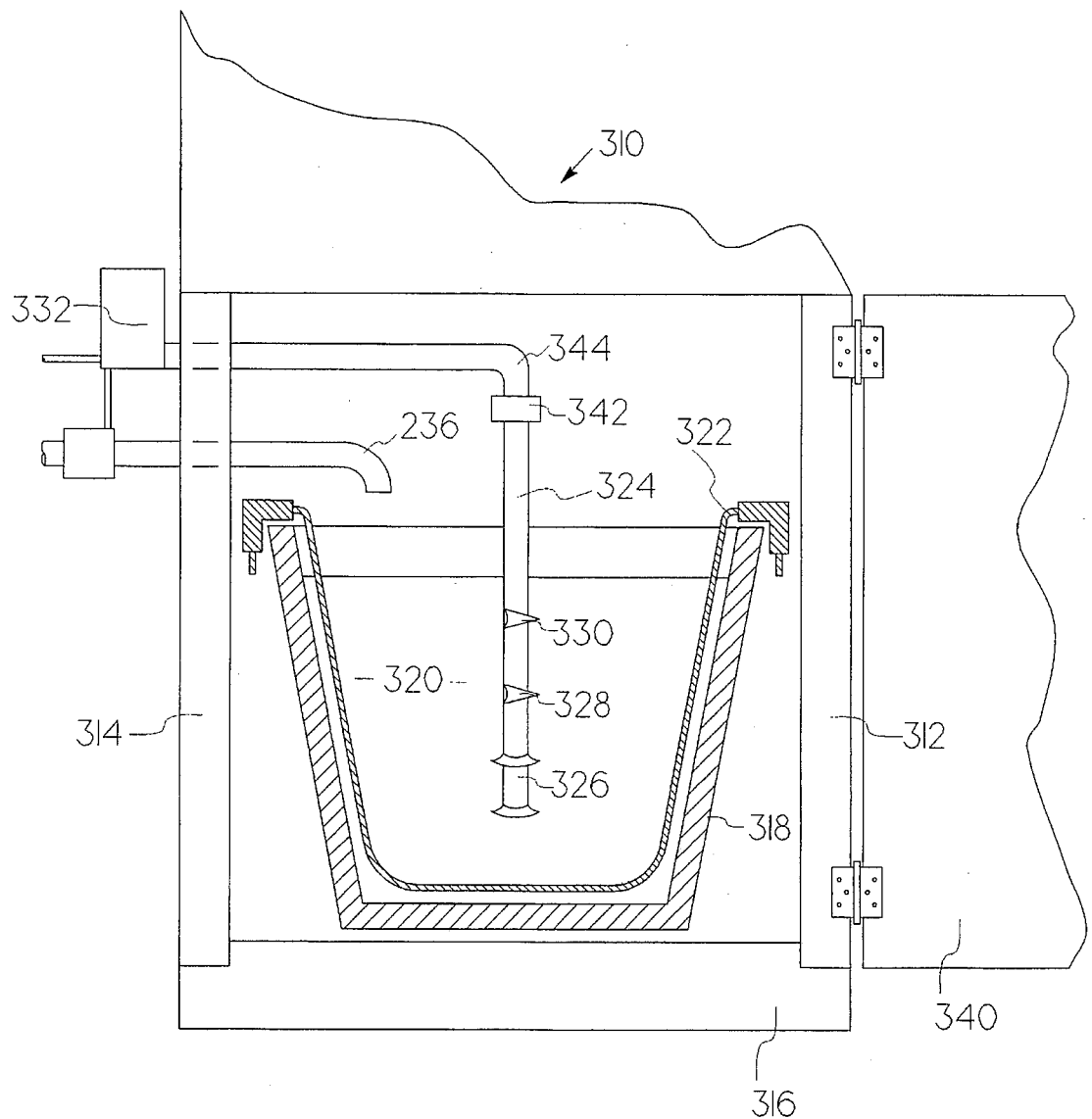
FIG. 3 is a cutaway side view of an alternate embodiment instant device.

An additional embodiment is disclosed in FIG. 3 wherein the heat chamber 310 is a polygonal and equipped with a door 340. The door 340 is connected to the wall 312 on one side and is provided with a lock or securing device to affix it to the opposite wall 314. The sensors 330 and 328 and heating element 326 are placed in the piping, however the sensor piping in this embodiment has been divided into two portions. The upper sensor piping 344 is place through the wall 314 and affixed to the control box 332. The upper sensor piping 344 is then connected to the lower sensor piping 324 at a connector 342. The connector 342 is a plug-in connector with a locking device, thereby allowing the electrical connections to be transferred from one pipe to another. To remove the vessel 318 from the heat chamber 310, the lower sensor piping 324 is disconnected from the upper sensor piping 344. The vessel 318 is slid out of the heat chamber 310 where the lower sensing piping 324 can be removed, the water 320 in the vessel 318 dumped and the liner 322 replaced. To reconnect the system, the lower sensor piping 324 is replaced in the vessel 318 and the vessel 318 returned to the heat chamber 310. The lower sensor piping 324 is replugged into the upper sensor piping 344 and the connection 342 locked. The door 340 is closed and secured against the wall 314.

As an option, the lower sensor piping 324 can be replaceable, a new pipe being used once the existing pipe is covered with mineral build-up.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A humidifier for a hot air furnace comprising a heat chamber and a duct, said heat chamber having at least one wall and a removable base and comprising:
a water retaining vessel, said water retaining vessel being positioned on said removable base;
water level sensor means, said water level sensor means registering the minimum and maximum operable water level;
heating means, said heating means incorporating heat sensing means;
water refill means; and
control means; said control means being connected to said water level sensor means, said heating means and said water refill means;

said duct connecting said heat chamber to the furnace duct work, wherein said control means controls the water level based on information received from said water level sensor means and controls the temperature based on information received from said heating means, thereby providing a constant level of evaporation within said heat chamber to be drawn through said duct.

2. The humidifier of claim 1, wherein said water retaining vessel is dimensioned such that removing said base provides for the removal of said vessel.

3. The humidifier of claim 2, wherein said heating means is positioned above said vessel, whereby removal of said vessel and said base is not obstructed by said heating means.

4. A humidifier for a hot air furnace comprising a heat chamber and a duct, said heat chamber having at least one wall and a removable base and comprising:
a water retaining vessel, said water retaining vessel being positioned on said removable base;
water level sensor means, said water level sensor means registering the minimum and maximum operable water level;
heating means, said heating means incorporating heat sensing means;
water refill means; and
control means; said control means being connected to said water level sensor means, said heating means and said water refill means;

said duct connecting said heat chamber to the furnace duct work, a removable liner, said removable liner being shaped to fit within the dimensions of said vessel and being positioned within said vessel, said water level sensors being in communication with the water in said water retaining vessel, through the wall of said vessel and through said removable liner, and wherein said control means controls the water level based on information received from said water level sensor means and controls the temperature based on information received from said heating means, thereby providing a constant level of evaporation within said heat chamber to be drawn through said duct.

5. The method of providing humidity for a hot air furnace comprising:

a heat chamber, said heat chamber comprising:
 at least one wall and a removable base;
 a removable water retaining vessel, said removable water retaining vessel being positioned on said removable base;
 a removable liner, said removable liner being shaped to fit within the dimensions of said vessel and being positioned within said vessel;
 water level sensor means, said water level sensor means registering the minimum operable water level and the maximum operable water level;
 heating means, said heating means incorporating heat sensing means;
 water refill means; and
 electronic control means; said electronic control means being electronically connected to said water level sensor means, said heating means and said water refill means and to a power source;
 at least one duct connecting said heat chamber to the furnace duct work;

comprising the steps of:
 placing said liner in said water retaining vessel;
 removing said removable base;
 placing said water retaining vessel onto said base;
 returning said within base to said heat chamber,
 activating said power source,
 registering the current water level with said water level sensors,
 transmitting said water level to said control means,
 registering said water level at said control means,
 activating said water refill means to fill said vessel to maintain said maximum water level,
 deactivating said water refill means when said water reaches said maximum water level,
 transmitting the current ambient temperature to said control means,
 activating said heating means to raise the ambient temperature in said heat chamber to a level sufficient to cause water evaporation,
 allowing the moisture created through evaporation to rise through said duct into said furnace duct work,
 monitoring said water and heat levels to constantly maintain a predetermined water level and temperature to cause water evaporation, whereby said moisture is distributed throughout the house through the duct work of said furnace, raising the moisture level throughout the house.

\* \* \* \* \*